United States Patent
Shan

(10) Patent No.: US 7,058,590 B2
(45) Date of Patent: Jun. 6, 2006

(54) SYSTEM AND METHOD FOR GENERATING CONVERSION-RELATED ESTIMATES UTILIZING ADAPTIVE SAMPLE SIZE

(75) Inventor: Jerry Z. Shan, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1103 days.

(21) Appl. No.: 09/849,808

(22) Filed: May 4, 2001

(65) Prior Publication Data

US 2003/0018501 A1  Jan. 23, 2003

(51) Int. Cl.
*G06F 17/60* (2006.01)
(52) U.S. Cl. ............................................ 705/10
(58) Field of Classification Search .................. 705/10
See application file for complete search history.

(56) References Cited

U.S. PATENT DOCUMENTS

| | | | | |
|---|---|---|---|---|
| 5,459,306 | A |  | 10/1995 | Stein et al. ............... 235/383 |
| 5,515,270 | A |  | 5/1996 | Weinblatt ................. 364/405 |
| 5,848,396 | A | * | 12/1998 | Gerace ...................... 705/10 |
| 6,006,197 | A | * | 12/1999 | d'Eon et al. .............. 705/10 |
| 6,078,924 | A |  | 6/2000 | Ainsbury et al. ......... 707/101 |
| 6,134,532 | A | * | 10/2000 | Lazarus et al. ........... 705/14 |
| 6,240,411 | B1 |  | 5/2001 | Thearling ................. 707/5 |
| 6,330,563 | B1 | * | 12/2001 | Heckerman et al. ..... 707/100 |
| 6,338,066 | B1 | * | 1/2002 | Martin et al. ............. 707/10 |
| 6,591,248 | B1 | * | 7/2003 | Nakamura et al. ....... 705/14 |
| 6,836,773 | B1 | * | 12/2004 | Tamayo et al. ........... 707/6 |
| 6,839,680 | B1 | * | 1/2005 | Liu et al. .................. 705/10 |
| 6,839,682 | B1 | * | 1/2005 | Blume et al. ............. 705/10 |
| 6,892,238 | B1 | * | 5/2005 | Lee et al. .................. 709/224 |
| 2001/0014868 | A1 | * | 8/2001 | Herz et al. ................ 705/14 |
| 2001/0056405 | A1 | * | 12/2001 | Muyres et al. ........... 705/52 |
| 2002/0016731 | A1 | * | 2/2002 | Kupersmit ................. 705/10 |
| 2002/0062245 | A1 | * | 5/2002 | Niu et al. .................. 705/14 |
| 2002/0099600 | A1 | * | 7/2002 | Merriman et al. ........ 705/14 |
| 2002/0128898 | A1 | * | 9/2002 | Smith et al. .............. 705/10 |
| 2002/0147570 | A1 | * | 10/2002 | Kraft et al. ............... 702/186 |
| 2002/0174182 | A1 | * | 11/2002 | Wilkinson et al. ....... 709/205 |
| 2003/0041050 | A1 | * | 2/2003 | Smith et al. .............. 707/1 |
| 2005/0159921 | A1 | * | 7/2005 | Louviere et al. ......... 702/181 |

FOREIGN PATENT DOCUMENTS

WO    WO 00/08802    *    8/2002

OTHER PUBLICATIONS

Lapin, Lawrence, Statistics for Modern Business Decisions□□Harcourt Brace Jovanovich, Inc., 1982, ISBN: 0-15-583743-5.*

(Continued)

*Primary Examiner*—Tariq R. Hafiz
*Assistant Examiner*—Scott L. Jarrett

(57) ABSTRACT

A method and system for processing test data relevant to specific behavior of visitors of a network accessible site, such as a website, includes a number of components. A first component is configured to determine an initial estimate of visitor behavior on the basis of pre-testing information. Such information may be entered by a manager of the site. A second component is configured to generate updates of the estimate in response to monitored behavior. Bayesian estimation may be employed in this component. The third and fourth components cooperate to dynamically adjust a measure of the required test sample size of the visitors so as to maintain a target statistical confidence level. The third component utilizes systematic sampling, while the fourth component uses negative binomial sampling.

15 Claims, 3 Drawing Sheets

OTHER PUBLICATIONS

Patterson, Pfaffenberger, Statistical Methods for business and economics—Richard D. Irwin, Inc., 1981.*

Matloff, Norman S., Probability Modeling and Computer Simulation—PWS-Kent Publishing Company, 1988, ISBN: 0-534-91854-9.*

Peacock, Peter R., Data mining in marketing: Part 1—Marketing Management, Winter 1998, pp. 8-18.*

Greening, Dan R., Tracking users Web Techniques, Jul. 1999, vol. 4, No. 7, pp. 50-58.*

Srivastava, Jaideep et al., Web Usage Mining: Discovery and Applications of Usage Patterns from Web Data SIGKDD Explorations, Jan. 2000, vol. 1, Issue 2.*

Gerad, Broussard, How advertising frequency can work to build online advertising effectiveness International Journal of Market Research, Winter 2000.*

Adknowledge.com web pages Mar. 2000, Retreived from Archive.org May 5, 2005.*

Accrue Insight eBusiness analysis software for your enterprise Accrue Software, Inc. 1998.*

Arad, Ami, Andromedia Analyzing, Optimizing & Justifying Dynamic Web Sites Andromedia, 1998.*

Weinberg, Sharon Lawner et al., Data Analysis for the Behavioral Sciences Using SPSS Cambrdige University Press, 2002, ISBN: 0-521-63651-6.*

Hague, Paul, Market Research Third Edition Kogan Page, 2003, ISBN: 0-7494-3730-8.*

Carlin, Bradley P. et al., Bayes and Empircal Bayes Methods for Data Analysis—Second Edition Chapman & Hall, 2000, ISBN: 1-58488-170-4.*

Novak, Thomas P. et al., Web Measurement Standards—New Metrics for New Media Apr. 1999.*

Sampling (statistics) Wikipedia.com, Retrieved Oct. 26, 2005.*

* cited by examiner

SYSTEM AND METHOD FOR GENERATING CONVERSION-RELATED ESTIMATES UTILIZING ADAPTIVE SAMPLE SIZE

TECHNICAL FIELD

The invention relates generally to processing test data that is relevant to a specific behavior of visitors at a network accessible site, such as a website available via the Internet, and more particularly to determining conversion rates of visitors to such sites.

BACKGROUND ART

With the widespread deployment of the global communications network referred to as the Internet, the capability of providing electronic service (e-service) has become important to even well-established traditional business entities. An "e-service" is an on-line service that markets goods or services, solves problems, or completes tasks. E-services are accessible on the Internet by entering a particular Uniform Resource Locator (URL) into a navigation program.

Operators of e-services are often interested in inducing visitors of a website to act in a certain manner. For example, an operator (i.e., e-marketer) may be interested in the sale of goods or services to visitors or may merely request that visitors register by providing selected information. When a visitor acts in the desired manner, the event may be considered (and will be defined herein) as a "conversion." The ratio of visitors who are converted to the overall number of visitors is referred to as a "conversion rate." Presently, conversion rates at Internet websites are relatively low, typically in the range of two percent to four percent.

For various reasons, managers of websites are interested in accurate measures of conversion rates. For example, a change in a conversion rate may be used as a measure of the effectiveness of a promotion. Promotional offers are often presented to visitors in order to induce the visitors to interact with the website in a desired manner, e.g., register or purchase a product. Promotional offers include providing a discount on the price of the product being sold, providing free shipping and handling of the product, and/or providing a cost-free item. The typical goal of a promotion campaign plan is to increase the conversion rate in a cost-efficient manner.

There are a number of considerations in determining estimations of conversion rate or other estimations of anticipated behavior by visitors to a network accessible site. On some occasions, there is available pre-testing information regarding the conversion rate of a website. There may be a relatively low or relatively high level of confidence in the accuracy of such information. Thus, one consideration is whether to incorporate the pre-testing information into the process of determining conversion rate. A second consideration is the selection of an approach for updating estimations. Yet another consideration involves selecting the sample size in testing visitors. Given the fact that each additional visitor that is tested causes a marketer to incur an additional cost and a potential loss in market opportunity, an important issue is determining how large the sample size needs to be in order to achieve a target level of confidence. A fourth consideration regards the methodology for sampling visitors for the testing.

What is needed is a method and system which address these considerations in the estimations of anticipated visitor behavior.

SUMMARY OF THE INVENTION

An adaptive testing approach utilizes at least some of four components that are cooperative in providing behavioral estimations that satisfy a required level of confidence of accuracy. As a first component of a system or method, the process is configured to determine an initial estimation on a basis of pre-testing information. For example, an e-marketer's prior knowledge may be incorporated into an initial conversion rate estimation by characterizing the knowledge with a suitable probability distribution. A second component is configured to generate updates of the estimation in response to monitored behavior of visitors to a network accessible site, such as a website. In one approach, the second component utilizes Bayesian estimation to provide updated estimations of subsequent visitor behavior. In third and fourth components, a minimum test sample size is determined while maintaining a target statistical confidence level. This determination is also adaptive, so that the measure of required test sample size is dynamically adjusted upwardly or downwardly in response to testing conditions. The third component uses systematic sampling. The fourth component is configured to utilize negative binomial sampling that is based on achieving the required confidence level.

Within the first component, the prior knowledge of a manager of a site is entered and utilized. Ideally, the prior knowledge is an estimation of the visitor behavior (e.g., conversion rate), with the estimation being within a target confidence interval. However, in some situations, the manager is not able to provide an estimation of the conversion rate. Instead, another type of information may be available. For example, the manager may specify a conversion rate mean and a standard deviation, so that parameters of a prior distribution of the conversion rate can be determined using Bayes inference. In another possibility, the manager may specify a range of the conversion rate by a confidence interval. Again, Bayes inference may be used to determine the parameters of the prior distribution.

After observations of visitor behavior are obtained, a Bayes estimator may be used to provide automatic updates of the estimation of the conversion rate or other behavioral parameter of interest. In one embodiment, the point estimation is an average of the pre-test estimation and a maximum likelihood estimate that is a result of the observed behavior. Bayes estimation is especially useful if there is prior knowledge and only a small sample of observations, since a small sampling is susceptible to inaccuracies.

Regarding the determination of sampling size, the target number of successes (e.g., conversions) can be determined using systematic sampling at the third component. For example, from a probability criterion, a sample size may be identified as a ceiling. Then, from the expected number (N) of visitors, a requirement of the sampling pattern may be determined by dividing the expected number by the ceiling of the sampling size. A shortcoming of this systematic sampling approach is that there is a concern that the expected number of visitors will not be reached, so that the calculated test sample size will not be reached.

In the fourth component, the shortcoming of the systematic sampling is addressed. Specifically, negative binomial sampling is utilized. The measure of the minimum test sample size therefore becomes dynamically adjustable by requiring the estimate of conversion rate to satisfy a particular statistical confidence level. The fourth module operates best in situations in which there may be a low number of visitors to a site.

By integrating the four components, adaptive testing can intellectually and reliably address the main concerns of conversion estimation and testing. While the linkage of the first two components establishes the foundation for conversion rate estimation and updating, the linkage between the second and third components is a key to the dynamic sample size determination and allocation that provides managers with operational agility while maintaining targeted confidence. The linkage from the first and second components to the third and fourth components completes the automatic process in such a way that it provides seamless adaptive testing for predicting visitor behavior.

DETAILED DESCRIPTION

Figure 1:
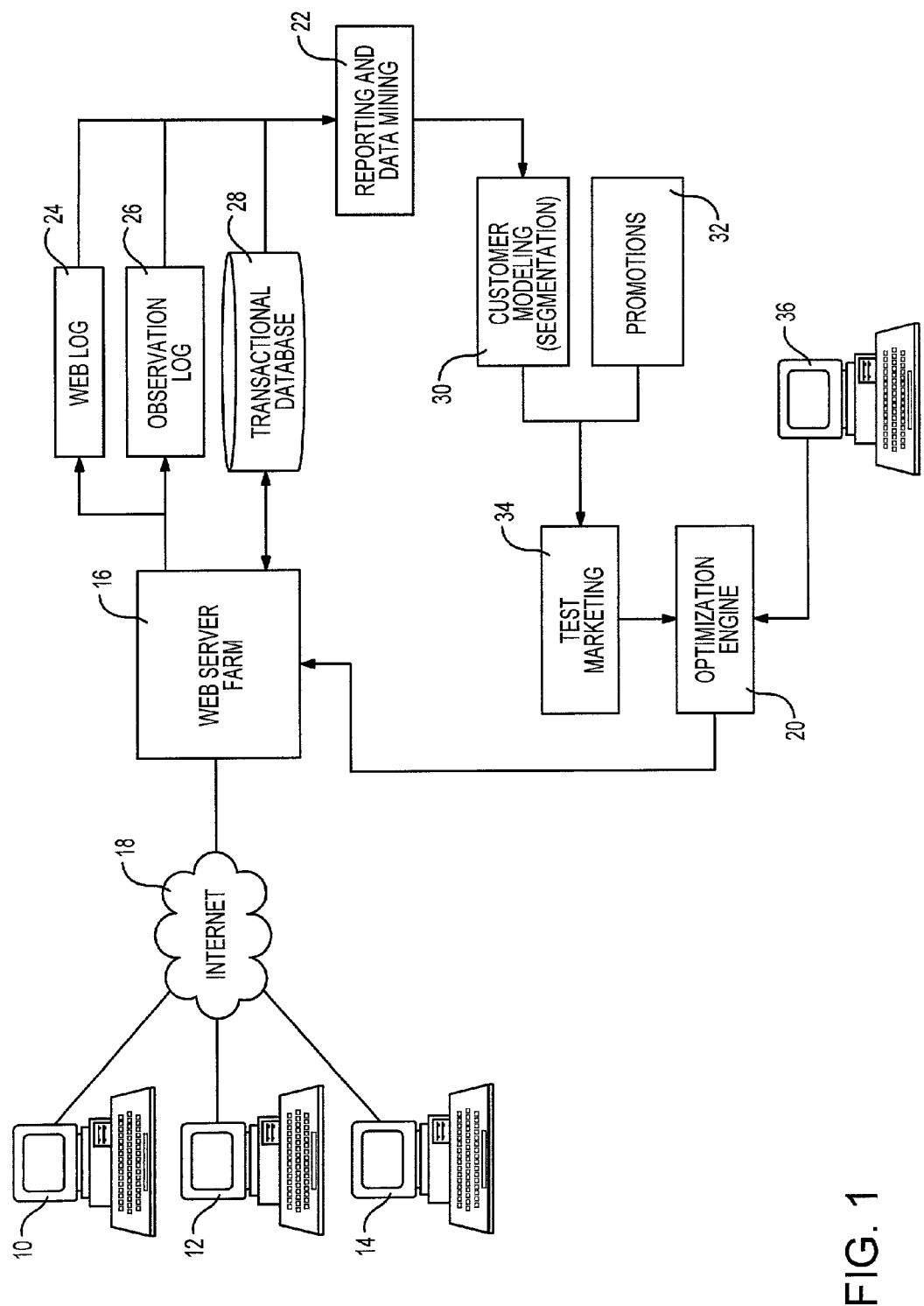
FIG. 1 is a schematic representation of an Internet-enabled system for implementing adaptive testing of behavior of a network site in accordance with the invention.

With reference to FIG. 1, a number of clients 10, 12 and 14 are shown as being linked to a web server farm 16 via the global communications network referred to as the Internet 18. The web server farm may include a variety of conventional servers or may be a single server that interfaces with the clients via the Internet. The clients may be personal computers at the homes or businesses of potential customers of the operators of the web server farm, if the operation is an e-service for selling goods and/or services ("products"). Alternatively, the clients 10, 12 and 14 may be other types of electronic devices for communicating with a business enterprise via a network such as the Internet.

The tool to be described below is intended to optimize the increased value derived from conversions of customers when promotions are offered to the customers. However, the adaptive testing invention may be used in other applications in which conversions are of significance to operators. A conversion is the act in which a visitor to a network site, such as a website, acts in a certain manner, such as purchasing a product or registering information.

A campaign plan for determining which promotion should be presented to which customers is mathematically determined by an optimization engine 20. Information may be acquired using known techniques. A reporting and data mining component 22 receives inputs from a conventional web log 24, observation log 26, and transactional database 28. The logs 24 and 26 acquire information either directly or indirectly from the customers at the clients 10, 12 and 14. Indirect information includes the Internet Protocol (IP) address of the client device. As information is acquired, the IP address may be used to identify a particular customer or a particular geographic area in which the client device resides. The indirect information may be obtained from conventional "cookies." On the other hand, direct information is intentionally entered by the client. For example, the client may complete a questionnaire form or may enter identification information in order to receive return information.

The transactional database 28 is a storage component for the customer-related data. When a customer enters a particular transaction with a business enterprise that is the operator of the web server farm 16, billing information is acquired from the customer. The billing information is stored at the transactional database. As more transactions occur, a customer history may be maintained for determining purchasing tendencies regarding the individual customer. The various customer histories can then be used to deduce common purchasing tendencies, as well as common tendencies with regard to reacting to promotions, so that customer modeling may occur at the segmentation component 30 of the system. Customer segmentation is preferably based upon a number of factors, such as income, geographical location, profession, and product connection. Thus, if it is known that a particular customer previously purchased a specific product, the purchase may be used in the algorithmic determination of customer segments.

A promotions component 32 includes all of the data regarding available promotions. The types of promotions are not critical to the invention. Promotions may be based upon discounts, may be based upon offering add-on items in the purchase of a larger scale item, may be based upon offering future preferential treatment (e.g., a "gold member") or may be based upon other factors (e.g., free shipping and handling).

A test marketing module 34 is the focus of the invention. The test marketing module may be used to determine a conversion rate which provides an estimate for predicting future customer behavior. For example, the estimate of conversion rate may be used to forecast product procurement needs. That is, the purchase of inventory may be at least partially based upon the estimate of the conversion rate.

Interaction with the design of a promotion campaign plan by a business manager takes place via a workstation 36. The business manager may enter information regarding parameters such as budget constraints, business objectives, costs and revenues. The budget constraints may relate to different stages of the process, so that there are specific budget constraints for the test marketing stage.

Figure 2:
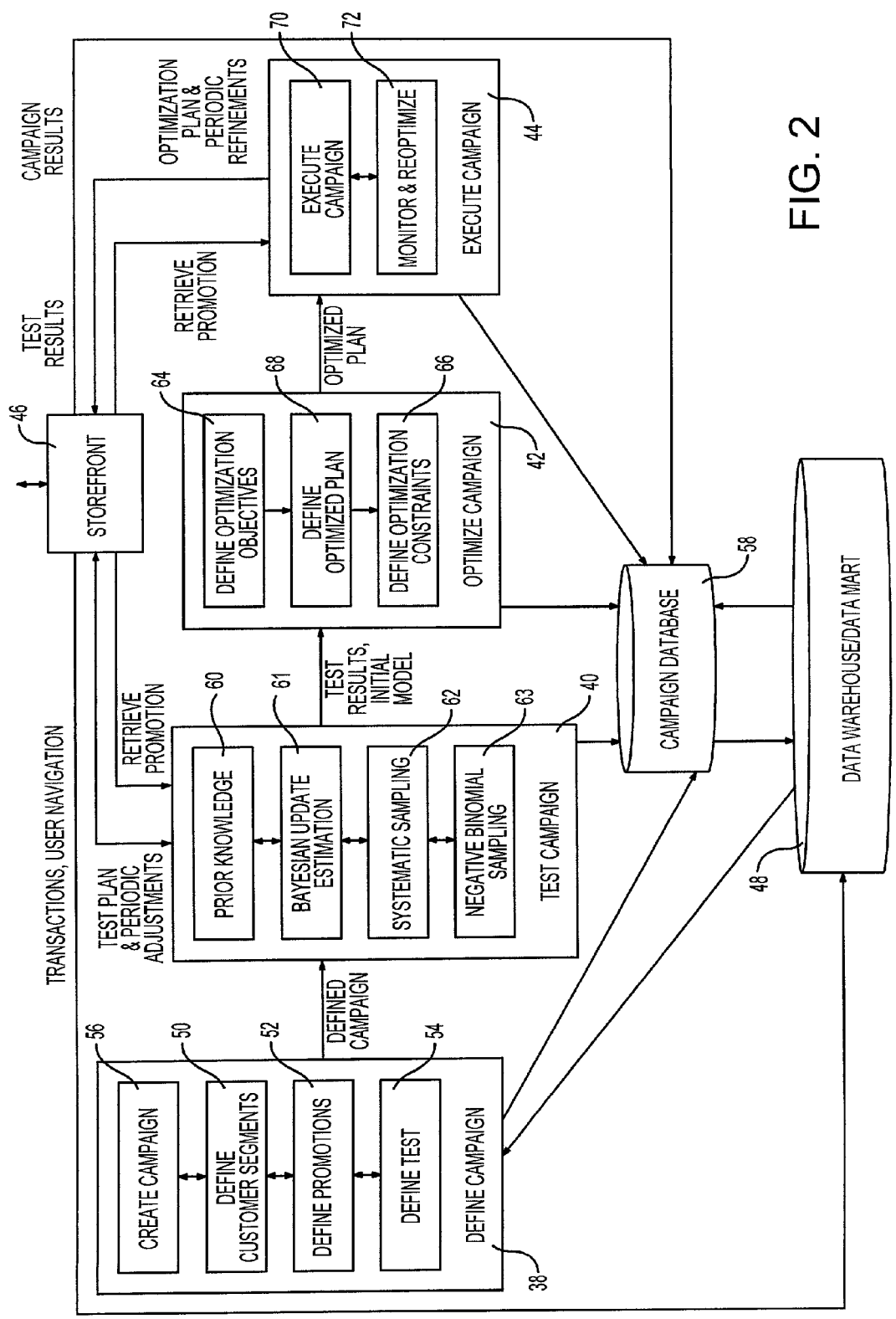
FIG. 2 is a block diagram of modules and components for designing, testing and executing a promotion campaign plan within the system of FIG. 1, with a testing module in accordance with the invention.

FIG. 2 illustrates the four stages of a promotion campaign plan. In a first stage 38, an initial campaign is defined. The defined campaign is passed to a stage 40 for the testing process that is the focus of the invention. It is at this stage that the invention is implemented.

The test results of an initial campaign model are passed from the test stage 40 to an optimization stage 42. It is at this stage that the differential allocation of promotions is determined for the different customer segments. The optimized campaign plan is then passed to an execution stage 44. This execution stage interacts with storefront software 46, such as that offered by Broadvision of Los Altos, Calif. The storefront 46 may be run on the web servers of the farm 16 of FIG. 1, so that clients 10, 12 and 14 may link with the system using conventional techniques, such as an Internet navigator. While the invention is described with respect to the interaction among the four stages, the test stage 40 that is the focus of the invention may be used in other architectures.

A number of actions take place within the campaign definition stage 38. Necessary information is retrieved from a data warehouse 48. One source of information for the data warehouse is the connection to the storefront 46. This connection allows the transactions with customers to be monitored. As relevant information is recognized, the information is stored. This information can then be used to define the customer segments, as indicated at component 50. Within the campaign definition stage 38, the promotions are defined 52 and the tests for ascertaining the effectiveness of the promotions are also defined 54. Thus, the initial model of the campaign can be created 56. This initial campaign plan is stored at a campaign data-base 58.

Within the testing stage 40, the tests that are defined within the component 54 of the campaign definition stage 38 are executed. As will be described more fully below, the testing stage is a system module that includes four cooperative components. As a first component 60 of the module, a manager of the system may incorporate prior knowledge into an initial conversion rate estimation. In one embodiment, the prior knowledge is incorporated by characterizing the knowledge with a suitable probability distribution. In a second component 61, an updating algorithm is used to automatically update the conversion rate estimation as a response to monitoring behavior of customers. Preferably, Bayesian estimation updating techniques are employed. In a third component 62, systematic sampling is employed to determine the minimum test sample size of customers for a given accuracy confidence level. The concern is that the actual number of customers will fall below the expected number, so that systematic sampling will be flawed in some applications. Therefore, a fourth component 63 incorporates negative binomial sampling for those occasions in which the customer count is low. The applicable algorithms will be set forth in detail in sections that follow.

The optimization stage 42 includes defining optimization objectives 64 (i.e., business objectives) and optimization constraints 66, so that an optimized campaign can be identified at component 68 of the stage. The resulting plan is stored at the campaign database 58 and is transferred to the execution stage 44.

As previously noted, the execution of the optimized plan utilizes the storefront 46. Preferably, in addition to the execution component 70, the stage 44 includes a capability 72 of monitoring and reoptimizing the plan. Thus, interactions with customers are monitored to recognize changes in dynamics which affect the campaign plan. The reoptimization is a reconfiguration that is communicated to the campaign database 58.

Details Regarding the Testing Stage

A number of assumptions will be made in the description of the testing stage 40. Firstly, it will be assumed that the goal of this phase is to provide an accurate prediction of future customer behavior. Typically, this prediction is based upon an accurate calculation of the conversion rate. In achieving this goal, generating profit within this stage is not an issue. Nevertheless, it is assumed that there is a testing budget. There may be an overall testing budget for the stage and individual budgets for the different customer segments defined in the component 50 of the campaign definition stage 38. It will also be assumed that the overall testing duration is reasonably set forth.

A "combination" will be defined herein as a segment-promotion pair. That is, each combination includes one customer segment that was defined in component 50 and one promotion that was defined in component 52. Different combinations can have different deterministic/stochastic conversion rates. In the description that is to follow, in some situations it will be assumed that the different conversion rates are not correlated, so that the combinations will be treated separately. In other situations it will be assumed that the conversion rates for the different combinations are correlated, so that they are dealt with jointly by establishing a correlated structure. Empirical Bayesian approaches may be developed in situations where it is assumed that the conversion rates are correlated.

Another assumption is that behaviors of visitors in the same combination are independent of each other and the individual conversion status $(Y_i)$ for each visitor has a binomial distribution $B(1,\theta)$, where $\theta$ is deterministic and is determined by the underlying mean customer characteristics and promotion attribute levels. In this binomial distribution, 1 is the number of trials for the individual visitors and $\theta$ is the conversion rate. In a first alternative assumption, customer segmentation is assumed to be perfect as far as conversion rate is concerned. Frequentist's statistical inference approaches will be developed under this model. As a second alternative assumption, it will be assumed that the customer segmentation is not perfect. Consequently, in addition to the variability of the binomial distribution, there is an added variable of the imperfect customer segmentation. Mathematically expressed $Y_i|\theta \sim B(1, \theta)$, and $\theta \sim G(\theta, \eta)$, where G captures the additional variability, Bayesian approaches are developed under this model.

A. Incorporation of Prior Knowledge

As previously described, the first component 60 of the testing stage 40 is a component of a testing module that allows a manager to enter previously acquired information relevant to determining the conversion rate of a combination. Referring to the process flow of steps of FIG. 3, the step 76 is one in which the prior knowledge is incorporated into the determination of visitor behavior. The invention will be described in the implementation in which conversion rate is the target measure of customer behavior.

It is possible that the prior knowledge that is incorporated at step 76 is a previously acquired sampling of visitors with regard to a particular segment-promotion combination. If the sampling is designated as Y and includes n visitors, then $Y=\{Y_1, Y_2, \ldots, Y_n\}$ If the assumptions are that the customer segmentation is perfect and the correlation rates among the different combinations are not correlated, classic point estimation may be used to determine a point estimate $(\hat{\theta})$ for the conversion rate of the combination. The point estimate is equal to $\overline{Y}$, so that:

$$\hat{\theta} = \overline{Y} = \sum_{i=1}^{n} Y_i/n \qquad \text{(Eqn. 1)}$$

This point estimate for the conversion rate is the maximum likelihood estimate (MLE) under the two assumptions. That is:

$$\overline{Y} = \text{argmax}_\theta L(\theta|Y) \qquad \text{(Eqn. 2)}$$

where the joint likelihood function is:

$$L(\theta|Y) = \prod_{i=1}^{n} \theta^{Y_i}(1-\theta)^{1-Y_i} \qquad \text{(Eqn. 3)}$$

Confidence intervals of the conversion rate $\theta$ may also be identified. A confidence interval of $\theta$ has a lower limit $\hat{\theta}_L$ and an upper limit $\hat{\theta}_U$. Thus, for a given confidence level $(1-\alpha)$, the probability function is such that:

$$P(\hat{\theta}_L \leq \theta \leq \hat{\theta}_U) = 1 - \alpha \qquad \text{(Eqn. 4)}$$

where the two limits are functions of the observations Y. For example, a confidence interval of 95 percent means that if the experiment is repeated under the same conditions 100 times, within 95 of those times the resulting interval is expected to contain the true conversion rate.

As is known in the art of statistical economics, the confidence interval of confidence level $1-\alpha$ is:

$$(\hat{\theta}-z_{1-\alpha/2}s.e.(\hat{\theta}), \hat{\theta}+z_{1-\alpha/2}s.e.(\hat{\theta})) \quad \text{(Eqn. 5)}$$

where the z value of $z_{1-\alpha/2}$ is obtainable from a standard table and where $s.e.(\hat{\theta})$ is the standard error of the point estimate $(\hat{\theta})$, with:

$$s.e.(\hat{\theta})=\sqrt{\hat{\theta}(1-\hat{\theta})/n} \quad \text{(Eqn. 6)}$$

Rather than the normal approximation of the confidence interval, a more exact determination can be made. For the sample Y having a sample size of n and having y conversions, the upper and lower limits of the confidence interval can be determined by the following equations:

$$\hat{\theta}_L = \frac{y}{y+(n-y+1)F_{2(n-y+1),2y}(1-\alpha/2)} \quad \text{(Eqn. 7)}$$

$$\hat{\theta}_U = \frac{y+1}{y+1+(n-y)F_{2(y+1),2(n-y)}(1-\alpha/2)} \quad \text{(Eqn. 8)}$$

Figure 3:
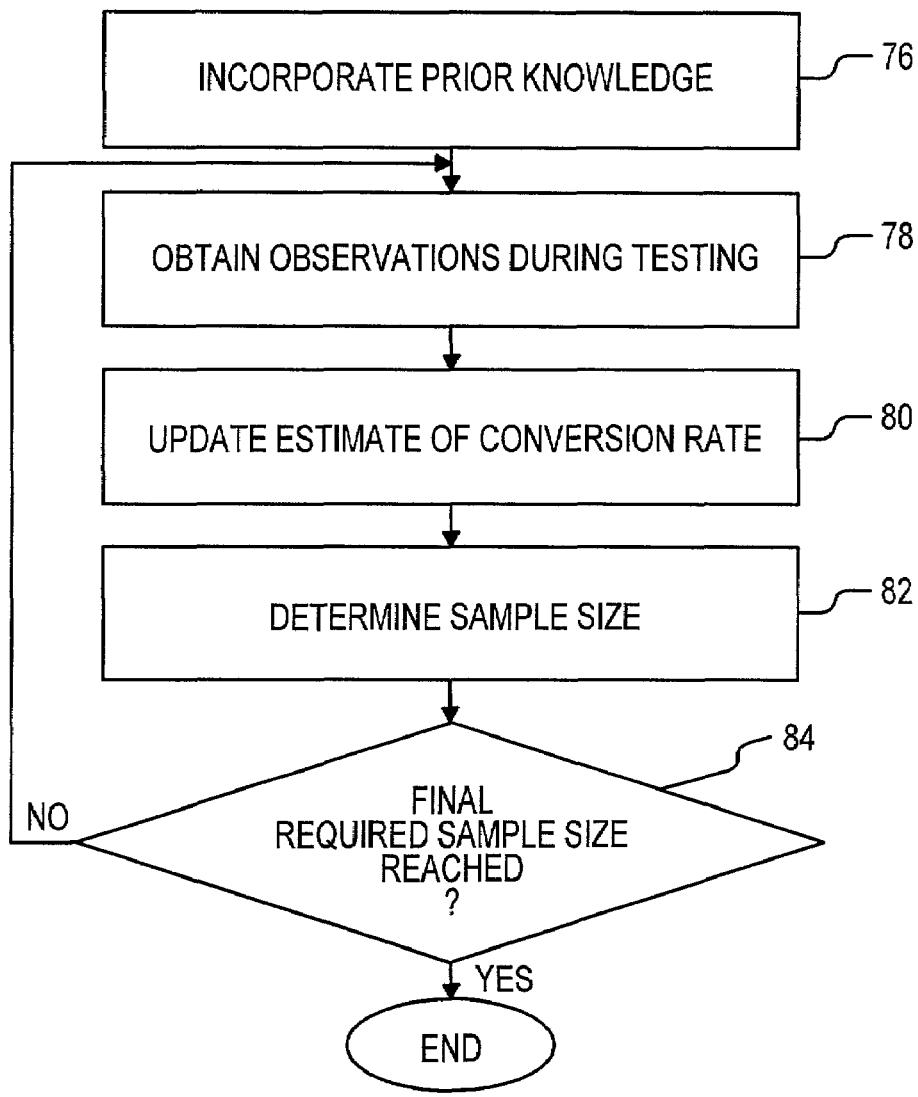
FIG. 3 is a process flow of steps for executing the invention.

Thus far, the implementation of step 76 of FIG. 3 has been described with the assumption that customer segmentation is perfect. However, if this assumption is not used, Bayesian approaches may be more advantageous. In one possible scenario, an e-marketing manager may not be able to provide a reasonable estimator for the underlying conversion rate, but may be able to specify some other type information. For example, the manager may be able to provide a mean $\theta_0$ for the conversion rate and may be able identify a standard deviation $(\sigma_0)$. From these specifications, parameters of a prior distribution on $\theta$ may be calculated using Bayes inference. One choice for the prior is the Beta $(\alpha, \beta)$ distribution. The algorithms for computing $\alpha$ and $\beta$ are as follows:

$$\hat{\alpha} = \theta_0\left(\frac{\theta_0(1-\theta_0)}{\sigma_0^2} - 1\right) \quad \text{(Eqn. 9)}$$

$$\hat{\beta} = (1-\theta_0)\left(\frac{\theta_0(1-\theta_0)}{\sigma_0^2} - 1\right) \quad \text{(Eqn. 10)}$$

On the other hand, the e-marketing manager may be able to specify the range of the conversion rate by a confidence interval $(x_1, x_2)$. That is, for a given confidence level $1-\alpha$, the probability specification is:

$$P(x_1 \leq \theta \leq x_2) = 1-\alpha \quad \text{(Eqn. 11)}$$

From this, the required parameters for the Beta distribution may be calculated as follows:

$$\hat{\theta}_0 = \frac{x_1 + x_2}{2} \quad \text{(Eqn. 12)}$$

$$\hat{\sigma}_0 = \frac{x_2 - x_1}{2z_{1-\alpha/2}} \quad \text{(Eqn. 13)}$$

$$\hat{\alpha} = \hat{\theta}_0\left(\frac{\hat{\theta}_0(1-\hat{\theta}_0)}{\hat{\sigma}_0^2} - 1\right) \quad \text{(Eqn. 14)}$$

-continued $$\hat{\beta} = (1-\hat{\theta}_0)\left(\frac{\hat{\theta}_0(1-\hat{\theta}_0)}{\hat{\sigma}_0^2} - 1\right) \quad \text{(Eqn. 15)}$$

After the parameters are calculated, Bayesian estimation may be used to compute a point estimation. The techniques will be described in the following section, since the Bayesian estimation may also be used in the updates of the conversion rate calculation as testing is implemented.

B. Bayesian Update Estimation

Referring to FIGS. 2 and 3, in step 78, observations are obtained during the testing process, so that an updated estimation of the conversion rate can be obtained. The expected value (E) for $\theta$, given Y, is as follows:

$$E(\theta|Y) = \left(\frac{\hat{\alpha}+\hat{\beta}}{\hat{\alpha}+\hat{\beta}+n}\right)\frac{\hat{\alpha}}{\hat{\alpha}+\hat{\beta}} + \left(\frac{n}{\hat{\alpha}+\hat{\beta}+n}\right)\frac{\sum_{i=1}^{n}Y_i}{n} \quad \text{(Eqn. 16)}$$

The parameters $\hat{\alpha}$ and $\hat{\beta}$ may be determined using Eqns. 14, 15 and 16. As can be appreciated, the expected value is the weighted average of the estimation of conversion rate based upon the prior knowledge of step 76 (i.e., $\hat{\alpha}/(\hat{\alpha}+\hat{\beta})$ and the MLE estimator that is based upon the testing without any prior knowledge (i.e., Eqn. 1). This Bayes estimation is especially useful if we have prior knowledge and only a small number of observations (n is small). As one example, given the current knowledge of on-line conversions, if a sampling of (1, 0, 1, 1) is observed, it typically is safe to estimate that the true conversion rate is much lower than the MLE estimate of 0.75. Such a high MLE estimate may be regarded as an occurrence largely due to chance.

If no prior knowledge is available, the parameters may be estimated using empirical Bayes analysis, which will not be described in detail in this document.

The update of the estimate of conversion is represented by step 80 in FIG. 3. While not critical, the update is preferably executed on a recurring basis. Thus, a conversion rate estimation is automatically updated as the behaviors of more customers are observed. As previously noted, one issue is determining the minimum required sample size in testing of the customers. In accordance with an aspect of the invention which will be described immediately below, the process provides regularly updated minimum sample size determinations. According to this aspect, the system is able to intelligently and promptly either reduce the unneeded size allocated previously in order to save testing cost and time or increase the required sample size in order to ensure that the required confidence level is reached in the final update.

C. Systematic Sampling

Step 82 in FIG. 3 represents the components 62 and 63 in the testing stage 40 of FIG. 2. The systematic sampling works well in applications in which there is a high and predictable number of visitors in each customer segment-promotion pair that defines a combination. On the other hand, negative binomial sampling is better suited for applications in which the number of visitors is either predictably low or unpredictable. Preferably, the system includes both sampling approaches. Therefore, the negative binomial sampling may be utilized until a threshold number of samples is acquired, after which the systematic sampling may be activated.

Within the systematic sampling, a probability criterion is proposed and it is assumed that behaviors of visitors within each combination are independent of each other and that the conversion rates among combinations are not correlated. Regarding the probability criterion, for a given confidence level (1−α) and for an upper bound (d) of the distance between the estimate $\hat{\theta}_n$ and the true value of θ (i.e., $|\hat{\theta}_n − \theta|$) the probability criterion is:

$$P(|\hat{\theta}_n - \theta| \leq \epsilon) \geq 1 - \alpha \quad \text{(Eqn. 17)}$$

where $\epsilon$ is the sampling precision. Therefore, the derived sample size is:

$$n^* = \text{ceiling}\left[\left(\frac{z_{1-\alpha/2}\sigma}{\varepsilon}\right)^2\right] \quad \text{(Eqn. 18)}$$

where $\sigma = \sigma(Y_1) = \sqrt{\theta(1-\theta)}$ is the standard deviation of a single conversion variable.

If the total number of expected visitors in a particular combination is N, the systematic sampling scheme is to sample n* visitors from N total visitors. Taking d=floor [N/n*], the scheme is to generate a random start s from integers {1, 2, . . . , d}, and make offers to visitors s, s+d, s+2d, . . . , s+(n*−1)d.

As previously noted, the shortcoming of the systematic sampling scheme is that the required sample size may only be reached if and when the N total visitors of a particular combination have visited the website.

D. Negative Binomial Sampling

It is supposed that the sequentially observed conversions $Y_1, Y_2, \ldots, Y_n$ are identically and independently distributed (i.e., i.i.d.~B(1, θ)), where θ is the conversion rate. When θ is small, as is experienced in current on-line conversion applications, the negative binomial sampling (also referred to as inverse binomial sampling) provides a faster solution than the random sampling and systematic sampling techniques. If m is the number of conversions that are determined to be needed and T is the total number of trails needed, then T has a negative binomial distribution.

$$P(T = t) = \binom{t-1}{m-1}\theta^m q^{t-m} \quad \text{(Eqn. 19)}$$

where q=1−θ. This negative binomial distribution applies for t=m, m+1 . . . This can be denoted by Y~NB(m, θ). As with any other sequential sampling scheme, the stopping point (or sample size) of NB sampling depends upon the actual data. Specifically, $$T = \inf\left\{t \geq m : \sum_{i=1}^{t} y_i = m\right\} \quad \text{(Eqn. 20)}$$

After m is determined, the implementation of T is straightforward. The expected value of T is m/θ<∞, so that negative binomial sampling necessarily terminates. From this property it can be seen that T/m is an unbiased estimator for 1/θ.

In fact, T/m is the uniform minimum variance unbiased (UMVU) estimator of 1/θ. Based upon this, it can also been seen that $\hat{\theta}$ m/T is an estimator for θ.

Thus, it is important to determine the number of conversions m. The following probability criterion is used in the determination of the required success number m for a given precision level e and for a given confidence level 1−α:

$$P\left\{\left|\frac{T}{m} - \frac{1}{\theta}\right| < \frac{\varepsilon}{\theta}\right\} \geq 1 - \alpha \quad \text{(Eqn. 21)}$$

The rationale of this probability criterion will become clearer from the explanation that follows.

For the decomposition:

$$T \stackrel{d}{=} \sum_{i=1}^{m} T_i \quad \text{(Eqn. 22)}$$

where $T_1, T_2, \ldots, T_m$, i.i.d.~g(θ), which is the geometric distribution with the success parameter θ. With the central limit theorem, the following approximation can be determined for Eqn. 21:

$$2\Phi\left(\frac{\sqrt{m}}{\sigma(T_1)}\frac{\varepsilon}{\theta}\right) - 1 \geq 1 - \alpha \quad \text{(Eqn. 23)}$$

Since $\sigma^2(T_1) = (1-\theta)/\theta^2$, Eqn. 23 can be simplified to:

$$\frac{\sqrt{m}\,\varepsilon}{\sqrt{1-\theta}} \geq z_{1-\alpha/2} \quad \text{(Eqn. 24)}$$

For any implementation, the ceiling of the answer is used in order to obtain the required integer. Therefore, the choice of m is:

$$m^* = \left(\frac{z_{1-\alpha/2}}{\varepsilon}\right)^2 (1-\theta) \quad \text{(Eqn. 25)}$$

The random event of the probability criterion of Eqn. 21 can be expressed in terms of the difference between θ and its estimator m/T. The random event is equivalent to the following:

$$\frac{1-\varepsilon}{\theta} \leq \frac{T}{m} \leq \frac{1+\varepsilon}{\theta} \quad \text{(Eqn. 26)}$$

It is then, of course, true that:

$$-\frac{\varepsilon\theta}{1+\varepsilon} \leq \frac{m}{T} - \theta \leq \frac{\varepsilon\theta}{1-\varepsilon} \quad \text{(Eqn. 27)}$$

Setting the lower limit of the precision level $\epsilon_L = -\epsilon\theta/(1+\epsilon)$, and setting the upper bound of the precision level $\epsilon_U = \epsilon\theta/(1-\epsilon)$, then the criterion of Eqn. 21 becomes:

$$P\left\{\varepsilon_L \leq \frac{m}{T} - \theta \leq \varepsilon_U\right\} \geq 1 - \alpha \quad \text{(Eqn. 28)}$$

The probability criterion now becomes more intuitive for the purpose of estimating θ by the estimator m/T. Another value of this last equation is that the manager can readily specify the precision level in estimating θ, expressed in terms of either $\epsilon_L$ or $\epsilon_U$. For example, once $\epsilon_U$ is specified, then:

$$\varepsilon = \frac{\varepsilon_U}{\theta + \varepsilon_U} \quad \text{(Eqn. 29)}$$

$$= -\frac{\varepsilon_L}{\theta + \varepsilon_L} \quad \text{(Eqn. 30)}$$

Inserting these expressions of ε into Eqn. 25, the calculations of m* become:

$$m^* = z_{1-\alpha/2}^2 (1-\theta)\left(1 + \frac{\theta}{\varepsilon_U}\right)^2 \quad \text{(Eqn. 31)}$$

$$= z_{1-\alpha/2}^2 (1-\theta)\left(1 + \frac{\theta}{\varepsilon_L}\right)^2 \quad \text{(Eqn. 32)}$$

It should be noted that the confidence interval of θ in the probability criterion is not symmetrical about θ, since it is generally true that the absolute of $\epsilon_L$ is not equal to the absolute of $\epsilon_U$. This is different from the traditional statistics inference approach. In fact, it is believed that the generalization to asymmetric confidence intervals has its advantage in the conversion rate context, since conversion rates are not regarded as having the same weight in reality. However, despite the asymmetric confidence interval, the formulas for computing m from either $\epsilon_L$ or $\epsilon_U$ are the same.

Using the negative binomial sampling approach, inputs may include (1) the conversion number m, (2) the lower precision level $\epsilon_L$, (3) the upper precision level $\epsilon_U$, (4) the confidence level 1−α, and (5) the estimated conversion rate θ. If item (1) is specified, then we just keep observing until the actual success number reaches m. However, it is difficult to specify m without any prior knowledge. Therefore, specifying items (2)/(3), (4) and (5) is required in order to compute for m. Note that we only need one of (2) and (3), not both. The desired outputs are the conversion rate point estimate and the conversion rate confidence estimate.

After the total number m of conversions are detected during the testing stage 40 of FIG. 2, the conversion rate point estimate is computed on the basis that $\hat{\theta}=m/T$. FIG. 3 includes a decision step 84 of determining whether a final required sample size has been reached. That is, a recalculation of the sample size occurs if the conversion number m is reached but the confidence requirements are not satisfied. If the confidence requirements are satisfied, the process ends, but if the sample size is renumbered, the process returns to the step 78 of obtaining observations. This process will be described in the next section. Briefly stated, upon checking on the attained confidence level length, it is determined whether additional sampling is needed.

E. Customer Allocation, Sequential Testing and Termination

During the testing stage, there are number of considerations that must be addressed. One consideration is the technique for allocating promotions to arriving visitors within a particular customer segment. In some situations, the assumed conversion rates are not informative. For example, an e-marketer may not be able to provide any relevant information. In such situations, there are advantages to allocating all promotions to the arriving visitors alternately during the testing stage. Thus, if there are two promotions, the odd numbered visits result in presentation of the first promotion, while the even numbered visits trigger presentation of the second promotion. This achieves some randomization effect which can reduce unaware biases. On the other hand, if informative inputs on the assumed conversion rates are available for the different combinations, a proportional sampling scheme may be implemented in the allocation approach.

For each combination of a customer segment and a promotion, an index (c) can be assigned on the basis of c=(i, k), where i is the customer segment and k is the promotion. Upon reaching a closing time (t), an attained confidence interval length D(c, t) is computed. Then, termination occurs for those c's in which the "convergence" of D(c, t) has been reached. One termination criterion for convergence is whether the variable moving average reaches a threshold. That is, termination occurs for those combinations that satisfy:

$$\left\{\sum_{i=1}^{t} D(c,i)/t\right\}/\hat{\theta}_t \leq 1-\alpha \quad \text{(Eqn. 33)}$$

where 1−α is a prespecified stabilization confidence level. For those 35 combinations that do not satisfy the criterion, if there is no promotion budget problem for continuing the sampling until t+1, the process runs for those combinations until t+1. On the other hand, if there are promotional budget problems, then ranking may occur for all remaining D(c) =D(c, t), with proper aggregation over t. After the ranking, the combinations with the lowest D values are terminated until there are no longer any promotional budget concerns. For the rest, the sampling continues to run until time t+1, whereafter the criteria of Eqn. 33 is again applied.

Upon the termination of any combination, the resulting conversion rate is used to reevaluate the sample size requirement for additional sampling needs. In some occasions, the termination period will be reestablished. As a note, it may be beneficial to store all raw conversion data in a log for subsequent use.

What is claimed is:

1. A computerized method of processing test data that is relevant to specific behavior of visitors of at least one network accessible site comprising the steps of:

receiving pre-test information related to determining an estimation of anticipated behavior of said visitors to said at least one network accessible site;

monitoring actual behavior of said visitors upon accessing said at least one network accessible site;

employing said pre-test information and a Bayesian estimation approach to said monitoring of said actual behavior so as to provide updated estimations of subsequent visitor behavior, said behavior being related to whether said visitors are converted while accessing said at least one network accessible site, said pre-test information and said updated estimations being related to determination of conversion rates;

determining a required test sample size for said monitoring of said actual behavior in order to provide said updated estimations of subsequent visitor behavior, including adaptively adjusting said determination of said required test sample size on a basis of achieving a target confidence level regarding said updated estimations; and determining a post-test estimation of said subsequent visitor behavior, including selecting between using a systematic sampling approach and using a negative binomial sampling approach, said negative binomial sampling approach being selected in response to unavailability of said required test sample size for said monitoring;

wherein an automatic process is defined by integration of said steps of receiving, monitoring and employing with said steps of determining a required test sample size and determining said post-test estimation, said post-test estimation being configured to provide a basis for determining interactions during subsequent visits to said at least one network accessible site.

2. The computerized method of claim 1 wherein said step of receiving said pre-test information includes accessing a probability distribution characterization of said anticipated behavior, including utilizing confidence parameters that are based on confidence of accuracy of estimates.

3. The computerized method of claim 1 wherein each said network accessible site is a website available via the global communications network referred to as the Internet.

4. The computerized method of claim 1 wherein said step of determining said required test sample size includes utilizing negative binomial sampling.

5. The computerized method of claim 1 wherein said step of determining said required test sample size includes utilizing systematic sampling.

6. The computerized method of claim 1 wherein said negative binomial sampling approach is used to calculate a predicted conversion rate of a desired behavior at a website.

7. A computerized method of processing test data that is relevant to specific behavior of visitors of at least one network accessible site comprising the computer-executable process steps of:

detecting conversions at said at least one network accessible site, where said conversions are specific interactions that are entered by said visitors;

utilizing automated negative binomial sampling to determine an adaptive minimum sample size for estimating a conversion rate for subsequent visitors, such that an estimated conversion rate is available for basing determinations regarding subsequent operations of said at least one network accessible site, including basing said adaptive minimum sampling size and an estimate of said conversion rate on said detecting of said conversions and upon a measure of confidence; and activating automated systematic sampling to determine said adaptive minimum sampling size for estimating said conversion rate upon detection of acquiring a threshold number of samples, said negative binomial sampling being disabled following said acquiring said threshold number of samples.

8. The computerized method of claim 7 wherein said step of utilizing negative binomial sampling includes determining a target number (m) of conversions and an anticipated number (T) of visitors in order to reach m, with T having a negative binomial distribution and with said estimate of said conversion rate being equal to m/T.

9. The computerized method of claim 7 wherein said detecting step includes monitoring visitor activity in interaction with a website of the Internet.

10. The computerized method of claim 7 wherein said measure of confidence is a confidence level regarding accuracy of said estimate of said conversion rate.

11. A computer-usable medium containing computer-executable code for processing test data that is relevant to specific behavior of visitors of at least one network accessible site comprising:

a first module component for determining an initial conversion-related estimate on a basis of pre-testing information;

a second module component for generating updates of said conversion-related estimate in response to monitored behavior of said visitors of said at least one network accessible site, thereby enabling operations at said at least one network accessible site to be determined on a basis of said conversion-related estimate;

a third module component for dynamically adjusting a measure of a required test sample size of said visitors while maintaining a target statistical confidence level, said third module component applying systematic sampling; and a fourth module component for utilizing negative binomial sampling to generate measures of said test sample size for occurrences in which said required test sample size of said third module component is unsatisfied.

12. The computer-readable medium of claim 11 wherein said first, second, third and fourth module components are cooperative to determine said conversion-related estimates as point estimates of conversion rates of said visitors to act in a desired manner, each said act being a conversion.

13. The computer-readable medium of claim 12 further comprising an execution module which monitors said visitors of a website, such that conversions of said visitors are detected.

14. The computer-readable medium of claim 11 wherein said second module component generates said updates utilizing Bayesian estimation.

15. The computer-readable medium of claim 11 wherein said third module component utilizes negative binomial sampling in determining said measure of said required test sample size.

* * * * *

UNITED STATES PATENT AND TRADEMARK OFFICE
CERTIFICATE OF CORRECTION

PATENT NO. : 7,058,590 B2 Page 1 of 1
APPLICATION NO. : 09/849808
DATED : June 6, 2006
INVENTOR(S) : Jerry Z. Shan It is certified that error appears in the above-identified patent and that said Letters Patent is hereby corrected as shown below:

In column 12, line 40, delete "35" before "combinations".

Signed and Sealed this

Fifth Day of May, 2009

JOHN DOLL
*Acting Director of the United States Patent and Trademark Office*